US006153884A

United States Patent [19]
Czimmek

[11] Patent Number: 6,153,884
[45] Date of Patent: Nov. 28, 2000

[54] RADIOISOTOPE PROXIMITY SENSOR

[75] Inventor: Perry Robert Czimmek, Yorktown, Va.

[73] Assignee: Seimans Automotive Corporation, Auburn Hills, Mich.

[21] Appl. No.: 09/095,987

[22] Filed: Jun. 11, 1998

[51] Int. Cl.[7] ................................................. G01T 1/164
[52] U.S. Cl. ..................... 250/393; 250/308; 250/336.1; 250/336.2; 250/381; 361/170
[58] Field of Search ................................. 250/308, 336.1, 250/336.2, 381, 393; 361/170

[56] References Cited

U.S. PATENT DOCUMENTS

| | | | |
|---|---|---|---|
| 3,158,028 | 11/1964 | Chope | 250/393 |
| 3,824,878 | 7/1974 | Grosseau | 74/866 |
| 4,276,580 | 6/1981 | Watson | 250/560 |
| 4,280,580 | 7/1981 | Wojcik | 180/169 |
| 4,317,078 | 2/1982 | Weed, et al. | 324/208 |
| 4,326,380 | 4/1982 | Rittmaster, et al. | 60/595 |
| 4,445,923 | 5/1984 | Shetterly | 65/158 |
| 4,713,544 | 12/1987 | Grage | 250/334 |
| 5,521,373 | 5/1996 | Lanier, et al. | 250/203.2 |
| 5,584,838 | 12/1996 | Rona, et al. | 606/96 |

*Primary Examiner*—Constantine Hannaher
*Assistant Examiner*—Otilia Gabor

[57] ABSTRACT

A radioisotope proximity sensor is provided for detecting proximity or distance to a nearby object containing a small radiation source complementary to the sensor. The output of the sensor is amplified or compared to determine the distance or proximity. The radioisotope proximity sensor is unaffected by magnetic fields over the short sensing distances. It is also unaffected by environmental contamination when the appropriate radiosource/detector combination is used. The radioisotope proximity sensor is easily shielded from electrostatic or electromagnetic noise, and the radiation source can be small, easily incorporated, and requires no external power or connections to affect mechanical reliability or impede armature movement.

18 Claims, 4 Drawing Sheets

RADIOISOTOPE PROXIMITY SENSOR

BACKGROUND OF THE INVENTION

1. Field of the Invention

The present invention relates to a radioisotope proximity sensor. More particularly, the present invention relates to a radioisotope proximity sensor for use in an electromechanical actuator.

2. Description of the Prior Art

Measurement of displacement and/or velocity of a moving armature in relation to a stationary structure near the armature is desirous for the purpose of electronic control in a valve timing system. For example, for a moving armature it is important to maximize soft-landing control. To such an end it is desirable to ensure that the armature comes in at the lowest velocity possible. In particular, it is desired for an E-core of an electromagnetic actuator of which the armature is a functioning component.

Other sensing techniques that have been explored include those that sense magnetic fields, e.g. Hall-effect, eddy-current, variable reluctance (VR), gigantic magnetorestrictive (GMR), direct inductance change of driving current, linear variable displacement transformer (LVDT) sensors, those that sense visible or infrared light, e.g. photosemiconductor source/detectors, backscatter, Doppler, interrupted beam, and those that sense electrostatic fields such as capacitive proximity or velocity sensors.

The disadvantages of each of the foregoing sensors are unique to their individual sensing techniques. The magnetic sensors have their signals corrupted by being immersed in a changing magnetic field that is a normal function of the electromagnetic actuator. Magnetic sensors have improved performance when operated at a distance from the actuator's magnetic circuit, but such a configuration increases the overall dimensions of the actuator. Optical sensors have the disadvantage of environmental sensitivity to contaminations that obscure or absorb the light, such as oil, dirt or suspended particles. Fiberoptic techniques are an option to accommodate optical methods, but are costly and may not be robust. Capacitive sensors are sensitive to electrostatic noise impressed on their unshielded exposed sensing plates. Such electrostatic noise is also present during actuator operation.

SUMMARY OF THE INVENTION

These and other deficiencies of the prior art are addressed by the present invention which is directed to a radioisotope proximity sensor. The radioisotope proximity sensor is unaffected by magnetic fields over the short sensing distances. It is also unaffected by environmental contamination when the appropriate radiosource/detector combination is used. The radioisotope proximity sensor is easily shielded from electrostatic or electromagnetic noise, and the radiation source can be small, easily incorporated, and requires no external power or connections to affect mechanical reliability or impede armature movement. The radioisotope proximity sensor can be used to ensure that the armature is at the lowest possible velocity, and can provide information concerning valve position.

BRIEF DESCRIPTION OF THE DRAWINGS

These and other attributes of the present invention will be described with respect to the following drawings in which.

DETAILED DESCRIPTION OF THE INVENTION

The sensor of the present invention consists of an ionizing radiation detector and a source of ionizing radiation. Ionizing radiation can be in the form of alpha particles, beta particles, gamma rays, or X-rays. Common commercially available radioisotope sources are Americium-241 for alpha and Strontium-90, Cobalt-60, Iron-55, and Tritium for combinations of beta, gamma and X-ray, all of which have half-lives of several years. Common detectors of ionizing radiation that can be used for the sensor of the present invention are ionization chamber and proportional detectors, and diode or transistor detectors, all being inexpensive and requiring no special provisions such as cryogenic operating temperatures or high operating voltages as Silicon-Lithium or Germanium-Lithium detectors require.

A good example of a source and detector combination for the radioisotope proximity sensor of the present invention is to use a 1–3 mm diameter capsule containing a few micro-Curies ($\mu$Ci) of Strontium-90 or Tritium as a source, with half-lives of 25 and 12.3 years, respectively, and chosen for their beta particle emission which provides for better penetration through oil, suspended particles or dirt that may otherwise affect performance, and a small ionization chamber detector, such as those used in consumer ionization-type smoke detectors that have been inexpensively marketed for decades.

Figure 1:
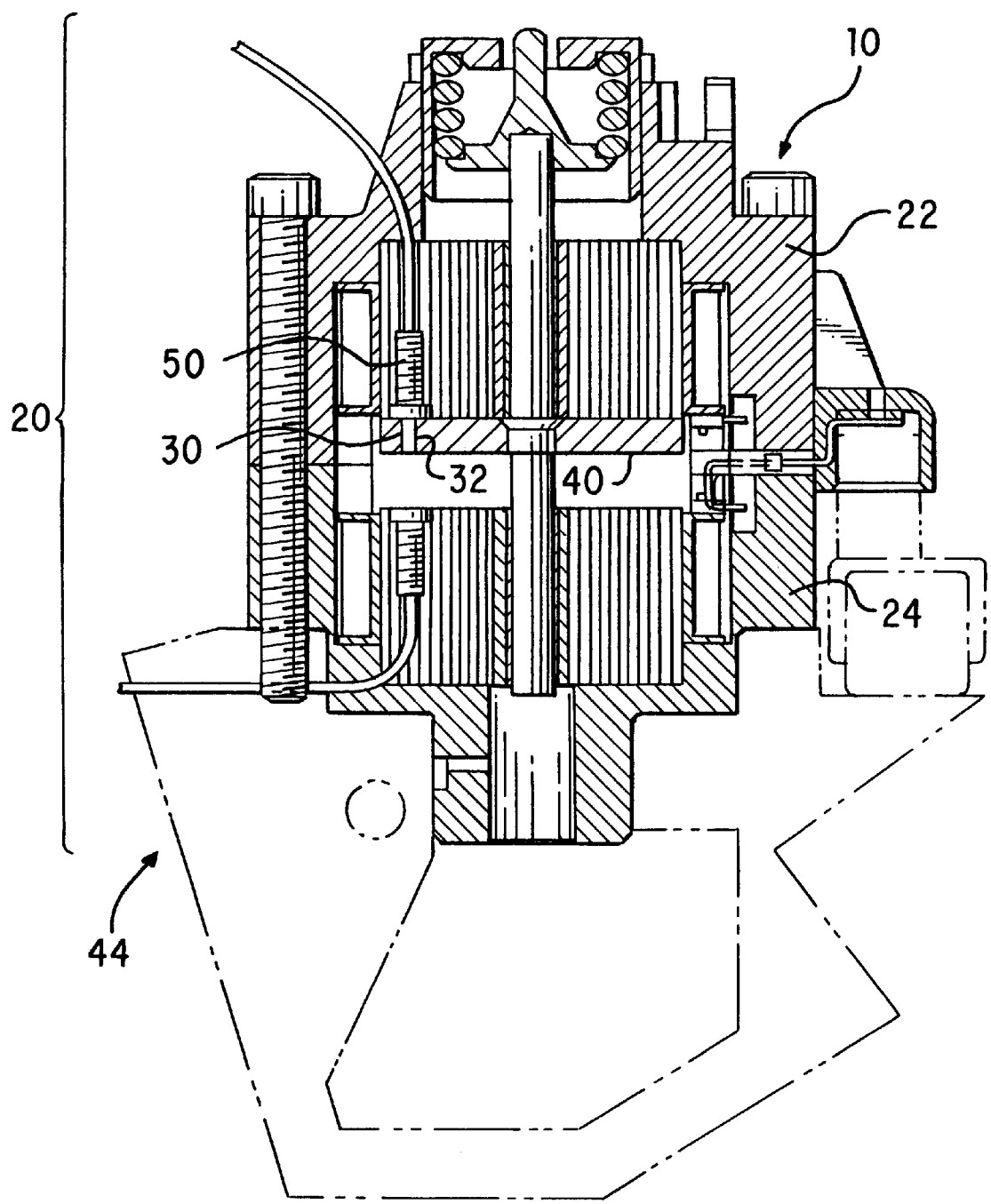
FIG. 1 is a cross-sectional view of a radioisotope proximity sensor utilized in an electronic valve timing actuator according to the present invention.

Referring to FIG. 1, an embodiment of the present invention is shown in the cross-section of an electronic valve timing actuator 10. The armature 40 is disposed inside the housing 20. The armature 40 provides motion to open and close a valve component (not shown). The housing 20 includes upper housing/E-core assembly 22 and lower housing/E-core assembly 24. The source of ionizing radiation 30 is placed in a small hole or recess 32 in the surface of the armature 40 of the electromagnetic actuator 44, so that the source of ionizing radiation 30 faces a detector 50. The source of ionizing radiation 30 is held in place in the recess 32 by convenient means, such as a crimp or an epoxy/adhesive.

The ionization detector 50 is placed in either one or both upper and lower actuator housing/E-core assemblies, 22 and 24, respectively, facing the ionizing radiation source 30 in the armature 40.

Figure 2A:
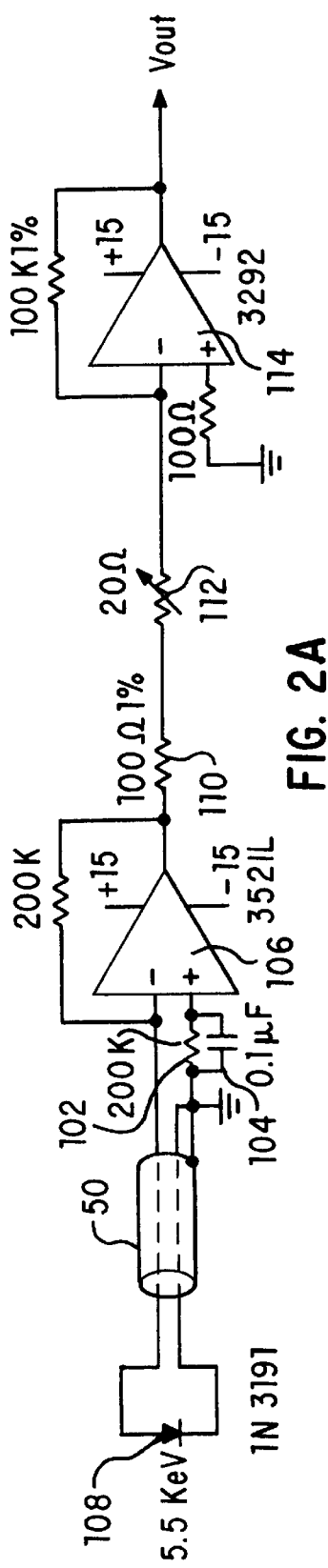
FIGS. 2a–2c are circuit diagrams of semiconductor amplifiers for the radioisotope proximity sensor according to the present invention.
Figure 2B:
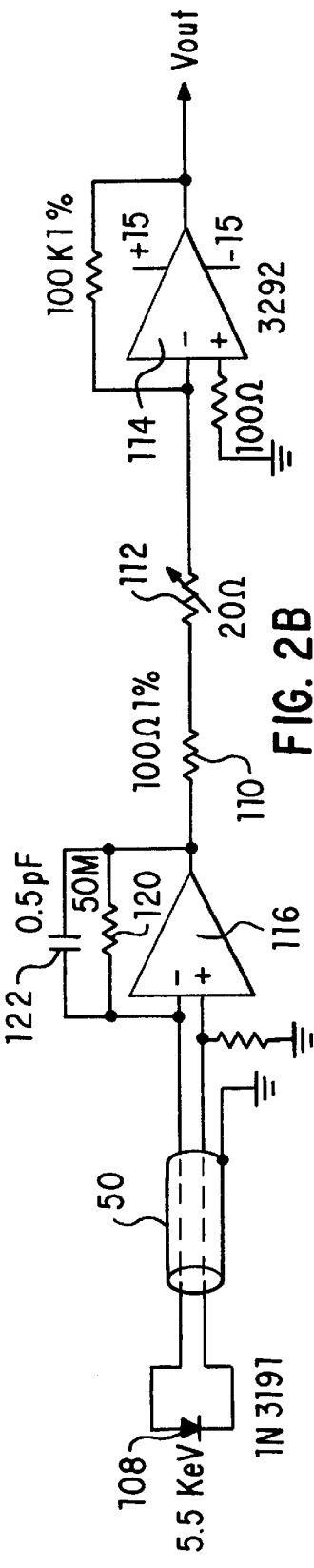
Figure 2C:
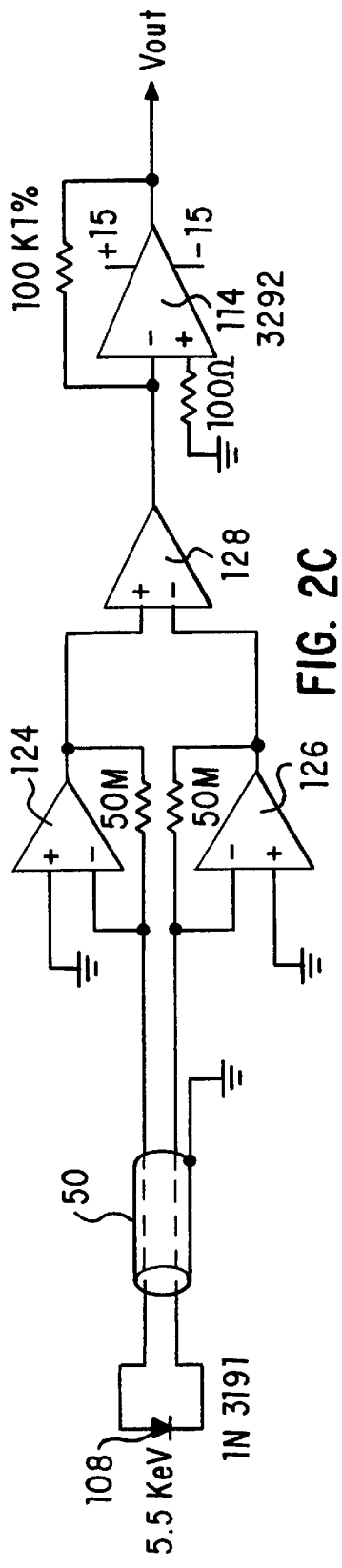

Appropriate electronic wiring, consisting of a signal wire and signal ground, both within a third independent ground conductor that shields both the signal conductors and the detector, connects the detector(s) to separately located electronics. The electronics consist of an appropriate signal amplifier, as shown in FIGS. 2a–2c, providing an output $V_{out}$ that varies with the change of resistance of current through, or voltage across, the ionization detector 50 as a result of a change in the proximity of the radioisotope source 30 to the detector 50. The output can be either a simple condition change to indicate the radioisotope source 30, and therefore the armature 40, is at or beyond a specific minimum or maximum proximity, or it can be a signal that varies in real time as the armature distance varies.

FIGS. 2a–2c and 4 show three variations and a block diagram of semiconductor amplifier electronics. In FIG. 2a, the detector 50 is connected to ground and, through resistor 102 and capacitor 104, connected in parallel, to the positive input of operational amplifier 106. The photodiode 108, which may be a low dark current aluminized photodiode, is connected to both the positive and negative inputs of the operational amplifier 106 which is an inverting amplifier. The output of the amplifier 106 is fed through a resistor 110 to a gain adjust 112. The output of the gain adjust 112 if fed through a second inverting operational amplifier 114, which provides $V_{out}$.

FIG. 2b is similar to FIG. 2a except that the operational amplifier 106 is replaced by amplifier 116 having a resistor 120 and capacitor 122 connected parallel to one another in the feedback portion of the circuit. The output of the amplifier 116 is fed to the negative input of amplifier 114.

In addition, a third variation is shown in FIG. 2c in which a pair or inverting amplifiers 124 and 126, have their outputs connected to the positive and negative inputs of a third amplifier 128. The output of the third amplifier is fed to the negative input of amplifier 114.

Figure 3:
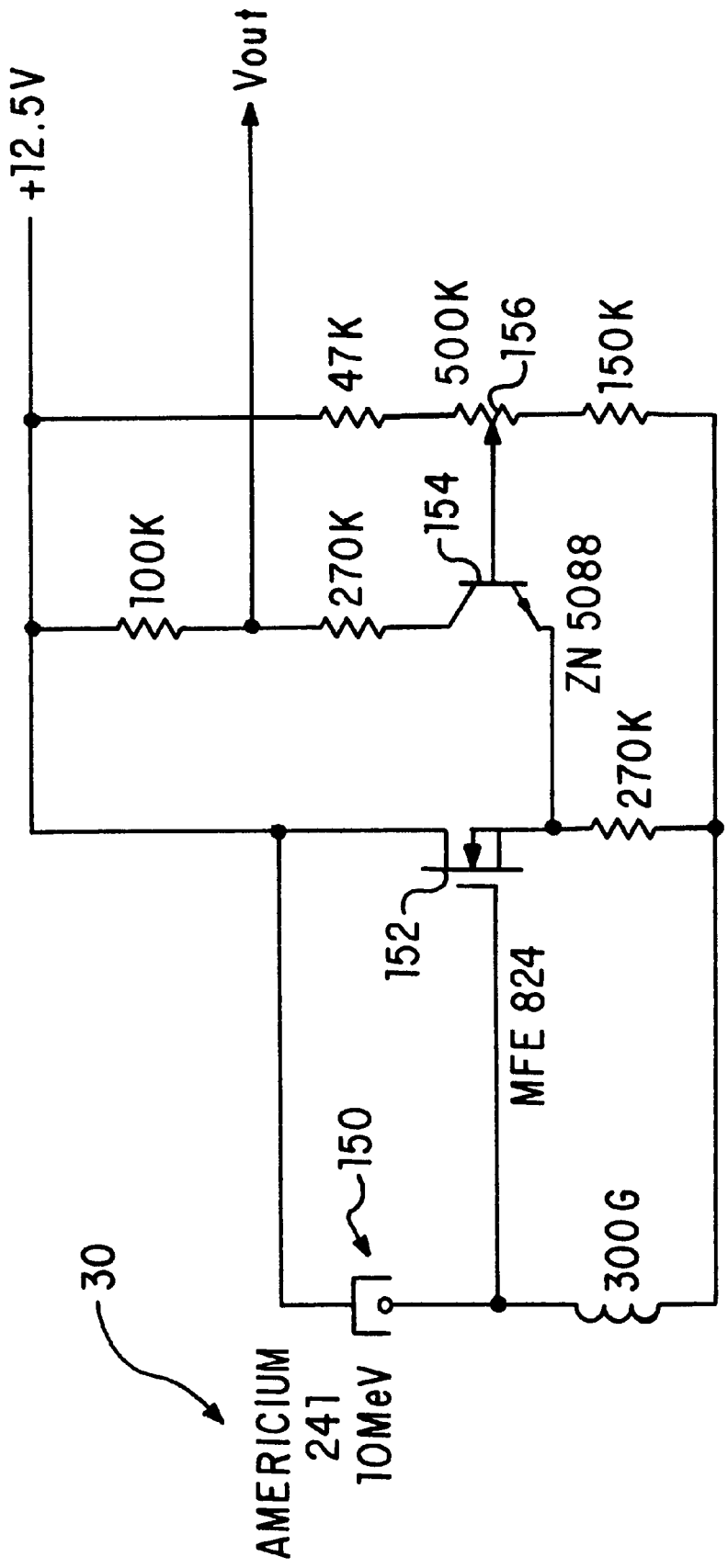
FIG. 3 is a circuit diagram of electronics for an ionization chamber for a radioisotope proximity sensor according to the present invention.

FIG. 3 illustrates a configuration for the ionization chamber electronics. The source of ionizing radiation 30 is Americium-241 and produces alpha particles. As stated previously, the ionizing radiation can also be in the form of beta particles, gamma rays, or X-rays, and may be, for example, Strontium-90, Cobalt-60, Iron-55, and Tritium for combinations of beta, gamma and X-rays.

The ionization chamber 150 is positioned so that the output $V_{out}$ will vary depending upon the position of the source of ionizing radiation 30 relative to the ionization chamber 150. The circuitry includes a MOSFET 152 connected to the ionization chamber 150. A bipolar junction transistor 154 works with the MOSFET 152 to produce an output that controls the variable gain 156. The output produced by the bipolar junction transistor 154 is dependent upon the position of the source of ionizing radiation 30 relative to the ionization chamber 150, and consequently the output from the bipolar junction transistor 154 causes the output $V_{out}$ to vary.

Figure 4:
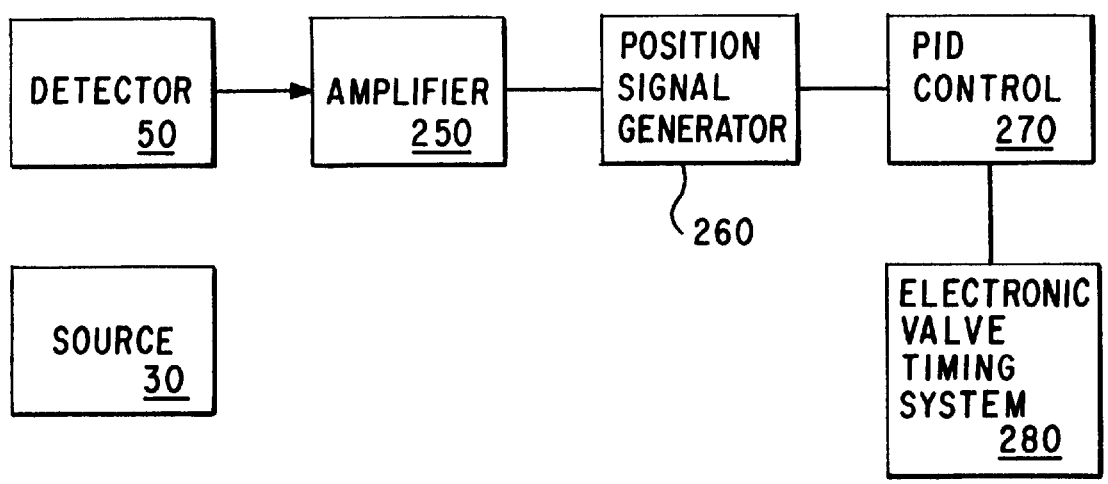
FIG. 4 is a block diagram of the circuit shown in FIGS. 2a–2c.

Referring to FIG. 4, an electronic soft landing control device, here an electronic valve timing system 280 receives position signal output, which is used to control the valve timing of an internal combustion engine. The ionizing radiation detector 50 senses the proximity of the ionizing radiation source 30, and the output of the detector 50 is fed to an amplifier 250. The amplifier 250 may take the form of the amplifiers shown in FIGS. 2a–2c or other suitable configurations. The output of the amplifier 250 is fed to a position signal generator 260, the output of which is sent to PID control 270, whose output is in turn sent to electronic valve timing system 280.

Having described several embodiments of the structure in accordance with the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A proximity detecting device comprising:
    a source of ionizing radiation; and
    a sensor for detecting said source of ionizing radiation, wherein said source of ionizing radiation is disposed in a first member, and said sensor is disposed in a second member, said device detecting a position of said first member relative to said second member by determining a position of said source of ionizing radiation relative to said sensor, and
    wherein said source of ionizing radiation and said sensor are disposed in an electromechanical actuator, and said source of ionizing radiation is disposed in an armature of said electromechanical actuator.

2. A proximity detecting device, as recited in claim 1, wherein said sensor is disposed in a housing of said electromechanical actuator.

3. A proximity detecting device, as recited in claim 2, wherein said sensor is disposed in said housing so that said sensor faces said source of ionizing radiation at some point during movement of said armature.

4. A proximity detecting device, as recited in claim 1, further comprising an amplifier which produces an output that varies with a change in proximity of said source of ionizing radiation to said sensor.

5. A proximity detecting device, as recited in claim 4, wherein said output indicates that said armature is at or beyond one of a specified maximum or minimum proximity.

6. A proximity detecting device as recited in claim 4, wherein said output is a signal which varies continuously as said armature moves.

7. A proximity detecting device, as recited in claim 1, wherein said source of ionizing radiation has no external power connections.

8. A proximity detecting device, as recited in claim 4, wherein said detecting device is impervious to magnetic fields over short sensing distances.

9. A proximity detecting device, as recited in claim 4, wherein said detecting device is not sensitive to optical contamination.

10. A proximity detecting device, as recited in claim 1, wherein said source of ionizing radiation is a radioisotope.

11. A proximity detecting device, as recited in claim 10, wherein said radioisotope is selected from the group:
    Americium 241, Strontium-90, Cobalt-60, Iron-55, and Tritium.

12. A proximity detecting device, as recited in claim 10, wherein said sensor is one of a proportional detector, a semiconductor detector, and a silicon surface barrier detector, and an ionization detector.

13. A proximity detecting device, as recited in claim 12, wherein said semiconductor detector is made from Germanium.

14. A proximity detecting device, as recited in claim 2, wherein said proximity detecting device operates to maintain said armature at a lowest possible velocity.

15. A proximity detecting device comprising:
    a source of ionizing radiation; and
    a sensor for detecting said source of ionizing radiation, wherein said source of ionizing radiation is disposed in a first member, and said sensor is disposed in a second member, said device detecting a position of said first member relative to said second member by determining a position of said source of ionizing radiation relative to said sensor, and
    wherein said detected position of said first member is provided to produce closed loop control in an electronic valve timing system.

16. A proximity detecting device in combination with an electromagnetic actuator for detecting movement of an armature of the electromagntic actuator, the armature being mounted for movement between a first electromagnet disposed in a first housing of said actuator and a second electromagnet disposed in a second housing of said actuator, the proximity detecting device comprising:

a source of ionizing radiation associated with one of said armature and a said housing, at least one ionizing radiation detecting sensor associated with the other of said armature and said housing so that said sensor detects a position of said armature relative to said housing by determining a position of said source of ionizing radiation relative to said sensor.

17. The combination according to claim 16, wherein said source of ionizing radiation is associated with said armature and said sensor is associated with said housing.

18. The combination according to claim 17, wherein a sensor is associated with each of said housings.

* * * * *